June 15, 1965  W. ST. JOHN WHITE  3,189,903
RADIO NAVIGATION SYSTEMS
Filed June 18, 1962  2 Sheets-Sheet 1
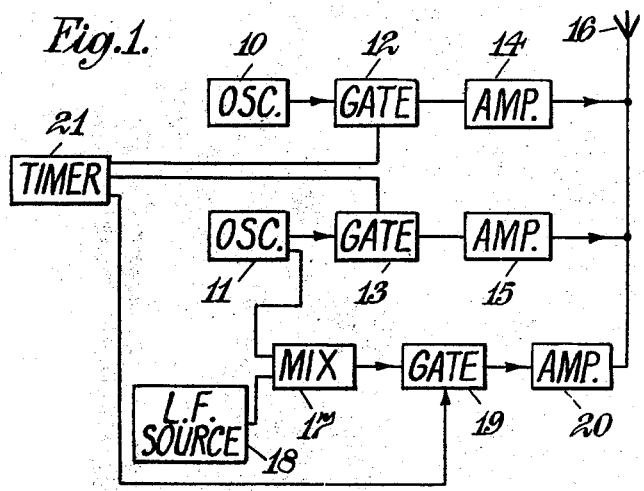
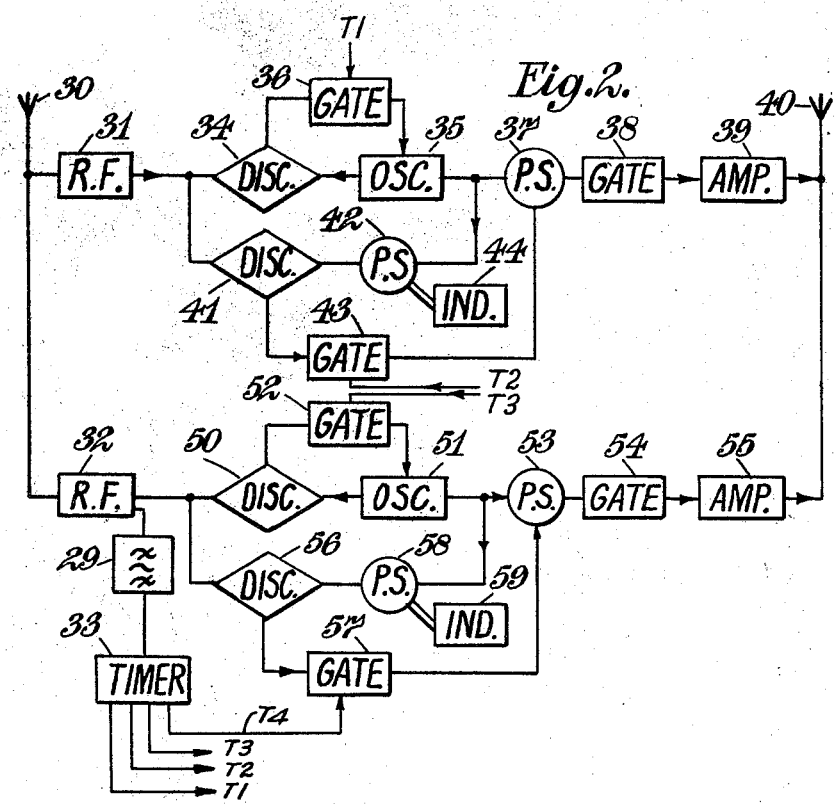

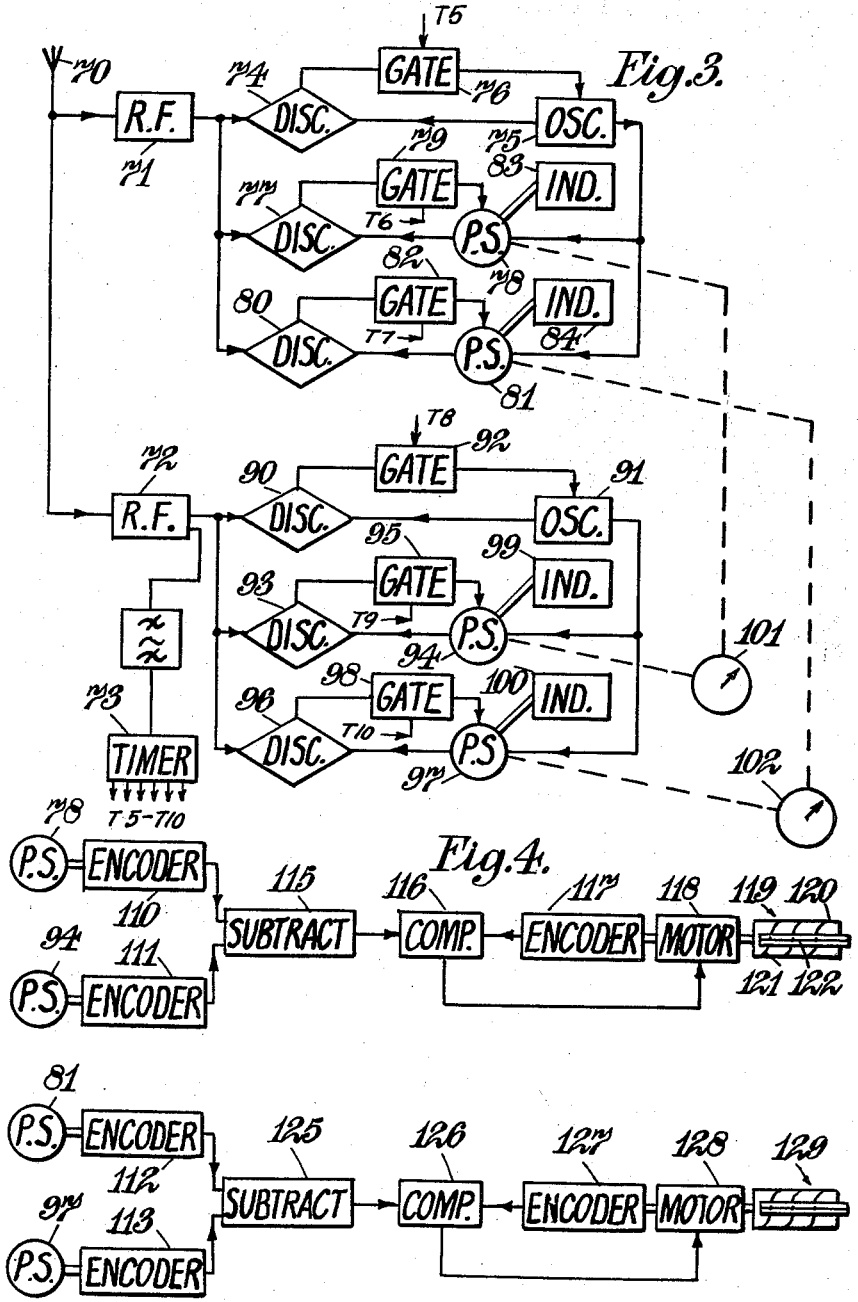

3,189,903
    RADIO NAVIGATION SYSTEMS
Wilfred St. John White, London, England, assignor to
  Decca Limited, London, England, a British company
     Filed June 18, 1962, Ser. No. 203,276
Claims priority, application Great Britain, June 19, 1961,
               22,019/61
          6 Claims. (Cl. 343—105)

This invention relates to radio navigation systems in which signals of the same frequency are radiated in fixed phase relationship from spaced transmitting stations in a time-sharing sequence whereby at a mobile receiver positional information may be obtained by comparing the phases of the received signals. Such a system may employ transmission stations at fixed locations usually three or four stations, in which case the lines of constant phase relationship between the signals received from the transmitting stations form patterns of intersecting sets of hyperbolae whereby, by measuring the phase relationship at the receiver, it may be determined on which hyperbolic line in each set the receiver is located. Such a hyperbolic system can be used simultaneously by any number of mobile craft for position finding. For some purposes, however, it is convenient to have one of the transmitting stations, known as the master stations on the mobile craft with the receiver and to have another two stations, known as slave stations, at fixed locations, the phases of the signals radiated from the slave stations being locked to the signals from the master transmitting station. In such an arrangement the position lines of constant phase relationship at a mobile receiver between the master and the slave signals are in the form of concentric lines about the locations of the two slave stations so that the positional determinations at the receiver in effect determine the range from each of the two slave stations. Such a system is therefore commonly called a two-range system. A two-range system, although it can be used by only one mobile craft at a time, is slightly more accurate than a hyperbolic system and does not require the use of special charts with hyperbolic lattices. In both hyperbolic and two-range systems the frequencies employed and the distances between the transmitting stations are usually such that there are many complete cycles of phase change in moving across the coverage area of the system and hence in such radio navigation systems the informtaion obtained by a single phase determination, although it is accurate within a cycle of phase change, is ambiguous unless the particular cycle of phase change or "lane" can be identified. Once the system is set up, the particular cycle can be indicated by a counting or integrating type of indicator counting the cycles of phase change as the receiver moves across the field. For initial setting up, or for checking the counting type indicator, however, it is often desired to have means of identifying the particular cycle of phase change.

According to this invention, in a radio navigation system, a plurality of signals of different frequencies are radiated from each of a number of spaced transmitting stations, signals of each frequency being radiated from one station at a time in a time-sharing sequence to provide at a mobile receiver two pairs of comparison signals, the effective frequency of the comparison signals of one pair differing from the effective frequency of the comparison signals of the other pair by a frequency difference small compared with either of the two effective comparison frequencies and at a mobile receiver, there is provided phase determining means for producing outputs in accordance with phase comparisons between signals from the two stations at each of said effective frequencies, a first indicating means responsive to the output of one of said phase determining means and a second indicating means responsive to the difference of the outputs of said phase determining means. The first indicating means provide a positional indication with respect to one set of position lines, the spacing of which depends on the effective comparison frequency. The expression "effective comparison frequency" is used to mean the frequency which determines the spacing of the position lines. The actual comparison frequency may be different from this since it is possible to change the frequencies of both signals fed to a phase comparator without affecting the phase measured. The second indicating means provides an indication with respect to a coarser pattern and can thus be used to resolve any ambiguities in the fine pattern indication which is cyclically repetitive across the pattern.

In one arrangement of the invention, in a radio navigation system, signals of a first and a second frequency are radiated from each of a number of spaced transmitting stations, signals of each frequency being radiated from one station at a time in a time-sharing sequence in fixed phase relationship and the two frequenceis having a frequency difference small compared with either of the two radiated frequencies and, at a mobile receiver, there are provided, for each pair of stations used to obtain position line information, phase determining means for producing rotational movements of two members in accordance with phase comparisons between the radiated signals from the two stations on the first and second frequencies respectively, a first indicating means responsive to the output of one of said phase determining means and a second indicating means responsive to the difference of the rotational movements of said two members. Typically the frequency difference between the two frequencies would be of the order of 5% or 10% of one of the radiated frequencies. The first indicating means may be made responsive to signals of either frequency or in some cases it may be preferred to provide separate indicating means responsive to the phase determination signals of each of the two frequencies. The second indicating means gives in effect a positional indication with respect to a much coarser pattern position lines since the effective comparison frequency is the difference frequency and hence the indication on the second indicating means may be used to identify the particular lane or cycle of phase change on the first indicating means.

In the simplest form a differential type of indicator may be employed responsive directly to the difference of mechanical movements of the aforementioned two rotatable members.

Very conveniently, however, the rotatable members comprise digital encoders, e.g. digit discs, giving outputs in digital form representative of the angular position of the encoders and these two outputs in digital form are fed into a difference unit to obtain a difference signal in digital form which may then be used to drive an indicator. Such an arrangement may conveniently be used to drive a digital display unit. In some cases, however, it may be preferred to use an indicator having an index and a cooperating scale and preferably the indicator has a scale long enough to cover the complete range of possible variations over the field of cover of the system. For example, a drum may be employed with a helical scale around the drum cooperating with an index mark formed by an index line on a window in front of the drum extending parallel to the axis of the drum. To drive such a drum very conveniently the drum is provided with an electric drive motor and with a digit disc and the output signal from this digit disc, which is representative of the position of the drum, is compared with the required position represented by the output of the aforementioned difference unit, that is to say the difference of digital outputs from the digit discs on the aforementioned rotatable members. The drum drive motor is arranged then to drive the drum in accordance with this comparison to maintain the drum digit disc in a position corresponding to the output from the difference unit. By using such a drum, or by using some other form of indicator having a long scale such as a film or tape strip, the scale may be calibrated in units of distance of any required arbitrary nature, for example, feet or metres, instead of or in addition to markings represneting cycles of phase change.

In the transmitting system, very conveniently the two different frequencies are radiated simultaneously from each transmitting station, the radiaitons from the various transmitting stations being effected in a cyclic sequence. The control of the transmission timing may be effected by a timing control signal from one of the stations, conveniently the master station to the transmissions of which the other stations are locked in phase. The timing control signal may be for example a signal of a distinctively different frequency radiated for a short time interval, which signal can be received at each of the other stations and at the mobile receiver and used to control timing devices timing the various transmissions from the transmitting stations and the necessary switching operations at the receiver. At each slave station and at the mobile receiver, for each radiated frequency, a stable oscillator may be provided which is controlled, during the period of the master transmissions, to be locked to the phase of the received master signals. At each of the slave stations such an oscillator provides a source for controlling the phase of the slave signals whilst at the mobile receiver the oscillator provides a comparison signal for comparing, during the appropriate periods, with each of the slave transmissions to determine the phase relationship at the location of the receiver between the master and slave signals.

The following is a description of one embodiment of the invention reference being made to the accompanying drawings in which:

FIGURE 1 is a block diagram illustrating a master transmitting station for a radio navigation system;

FIGURE 2 is a block diagram illustrating one of a number of slave stations for use with the master station of FIGURE 1;

FIGURE 3 is a block diagram illustrating a receiver for use with the transmitting stations of FIGURES 1 and 2; and FIGURE 4 is a diagram illustrating part of a receiver which is a modification of the arrangement of FIGURE 3.

FIGURE 1 is a diagram illustrating a master station which may be used in conjunction with two or more of these slave stations, such as that illustrated in FIGURE 2, to form a position fixing system. All these stations may be located at fixed spaced points so as to form a hyperbolic phase comparison system in which, at a mobile receiver, by comparing the difference of phase of signals received from the master and slave stations, the position of the receiver can be determined with respect to hyperbolic patterns of equiphase lines. Alternatively the master station may be located on a mobile craft in conjunction with the receiver. In this case the system would be a two-range system in which the receiver, by determining the relative phase between the signals from the master and from each of the slave stations can determine the rang from each of the slave stations. The hyperbolic form of the system has the advantage that it can be used by any number of mobile craft which craft need carry only the necessary receivers. The two-range system on the other hand, although it can only be used by one craft at a time, has the advantage that it is slightly more accurate and it enables the position of the craft to be determined with respect to the two slave stations without requiring any previously prepared charts showing the hyperbolic patterns of equiphase lines. Thus the two-range system is particularly valuable for survey purposes or where it is not possible to prepare charts due to a change in the operation of frequency whereas the hyperbolic system is more suitable for providing general navigational facilities. The transmitting stations and receivers to be described with reference to the drawings are equally applicable to both two-range and hyperbolic systems.

FIGURE 1 illustrates the construction of the master station and this is arranged for radiating simultaneously radio frequency signals of two different frequencies to provide two signals for phase comparison purposes. The two signals differ in frequency by an amount which is a small fraction of either of the two frequencies, for example by the order of five or ten percent of one of the frequencies. These two frequencies are provided by crystal oscillators 10, 11 the outputs of which are fed via gates 12, 13 respectively to two power amplifiers 14, 15 which feed the signals to a transmitting aerial 16. The slave stations operate on the same frequencies as the master station in a time-sharing sequence. In this particular embodiment, the signals from the master station are radiated for a period of 0.3 second and are then interrupted for a period whilst transmisions take place from the slave stations. Typically two slave stations would be employed and these might also radiate for a period of 0.3 second so that there would be an interval of 0.6 second after the end of the master transmissions before the cycle of transmissions recommences. For timing the operation of gates at the slave stations and at the mobile receiver, the master station radiates also a synchronising signal which is conveniently a signal of a frequency slightly different from that of one of the oscillators 10, 11. This timing signal is illustrated as being produced by a mixer 17 mixing the output of the oscillator 11 with that of a low frequency signal source 18 to produce the required different frequency signal which is fed through a gate 19 and power amplifier 20 into the aerial 16. The synchronising signal typically might be radiated for a period of 0.1 second immediately before the transmissions from the oscillators 10, 11. The timing of the various transmissions is controlled by a timing unit 21 which opens the gates 12, 13 and 19 for the appropriate periods.

Although in FIGURE 1 there has been shown oscillators directly feeding power amplifiers, heterodyne systems may be employed for generating the various different frequencies, for example, a single radio frequency oscillator may be employed, the output of which is mixed with the outputs of low frequency oscillators having different frequencies to provide the various different radiated frequencies.

The slave stations, except for the timing of their transmissions in the cycle, are identical and one slave station is illustrated in FIGURE 2. This slave station is arranged to transmit for a period of 0.3 second after the end of the master transmission, radiating on exactly the same frequencies as the master signals and with the transmissions locked to the received master signals in phase. The other slave would transmit for a period of 0.3 second after the end of the first slave transmissions. Referring to FIGURE 2 the slave station has a receiving aerial 30 coupled to two radio frequency receivers 31, 32 tuned to receive the two different frequencies radiated by the master station for phase comparison purposes. The synchronising signal will be received also by the receiver 32 since its frequency is very close to that produced by the oscillator 11 and it will come within the bandwidth of the receiver 32. The synchronising signal is extracted by means of a frequency selective filter unit 29 and fed to a timer 33 for controlling the operation of the various gates at the slave station.

The outputs from the two radio frequency receivers 31, 32 are treated in a similar manner and the output from the unit 31 will be considered first. This signal is fed to one input of a phase discriminator 34 where it is compared in phase with the output of an oscillator 35. This oscillator 35 is a stable oscillator, typically a crystal oscillator, tuned to the frequency of the appropriate master transmission, that is to say the frequency of oscillator 10. The discriminator 34 gives an output when there is any phase difference between the output of the oscillator 35 and the received signal from receiver 31. This output from the discriminator is gated by a gate 36 which is opened by the aforementioned timer 33 only for the period of the appropriate transmissions from the master station. The output from the gate 36 is thus representative of the difference of phase between output of the oscillator 35 and the received master signals. From the gate 36, the output of the discriminator is fed as a control signal to control the phase of the oscillator 35 to hold that phase at a predetermined relationship with the phase of the received master signals. The gate 36 prevents the oscillator control being affected by any signals except the appropriate transmissions from the master station and the oscillator 35, being a stable oscillator, thus provides a continuous, i.e. uninterrupted, signal output having a phase which represents the phase of the master transmissions derived from the oscillator 10. The output from this oscillator 35 is used to provide the required signals for radiating from the slave station and for this purpose the output from the oscillator 35 is fed through a goniometer type phase shifter 37 (that is to say, a phase shifter having a rotatable element the angular movement of which varies the phase shift introduced) and thence via a gate 38 controlled by the timer 33 to a power amplifier 39 which feeds a transmitting aerial 40. The gate 38 is opened for the required period of the transmissions from this slave station.

The output from the radio frequency receiver 31 is also fed to a second discriminator 41 which also compares the phase of the signals received from the receiver 31 with the phase of the output of the oscillator 35. The output from the oscillator 35 is fed to the phase discriminator through a manually adjustable phase shifter 42 which is used for control purposes. This discriminator 41 is used to compare the output from the oscillator 35 with the received slave transmissions during the period of the transmissions from the slave station so as to detect any local phase shifts in the transmitting station. The output of the discriminator 41 is used to control the aforementioned phase shifter 37 and this output circuit thus includes a gate 43 which is opened by the timer 33 during the period of the slave transmissions so that the control is applied to the phase shifter 37 only in response to any errors in the phase relationship between the radiated slave signals as picked up at the aerial 30 and the output for the oscillator 35. It will be seen that the phase shifter 42 enables phase adjustment to be effected of the pattern produced by the master and the slave; alteration of this phase shifter produces shifts of the equiphase lines of the pattern. The pattern is usually standardised with zero phase shift on the phase shifter 42 and an indicator 44 may be provided coupled to this phase shifter for indicating this phase shift. The phase shifter 42 may be manually adjusted if it is desired to alter the phase relationship between the slave transmission and the received master signal. The phase shifter 37 adjusts the phase of the radiated slave signals to maintain the required phase relationship between these signals and the output of the oscillator 35. This oscillator is locked in phase to the received master signals by the discriminator 34 and thus the radiated slave signals are locked in phase to the previously received master signals of the same frequency.

The output from the receiver 32 is used to control the second signal to be radiated from the aerial 40 of the slave station in a similar manner to that employed for the first signal. For this purpose the output from the receiver 32 is compared in phase in a phase discriminator 50 with the output of a further oscillator 51 which again is a highly stable oscillator tuned to the appropriate frequency. The output from the discriminator 50 is fed via a gate 52 which is open during the period of the master transmissions to the oscillator 51 as a control signal so as to hold the oscillator 51 locked in phase to the received master transmissions. The output from the oscillator 51 is fed through a goniometer type phase shifter 53 and a gate 54 to a power amplifier 55 and thence to the aerial 40. A further phase discriminator 56 is provided which compares the output from the radio frequency amplifier 32 with the output from the oscillator 51 and the output from this phase discriminator 56 is fed through a gate 57 which is opened during the period of the slave transmissions to provide a control signal for the aforementioned phase shifter 53. The discriminator 56 provides an output representative of any changes in phase through the slave transmitting system since it compares the phase of the slave signals as picked up by the aerial 30 with the output of the oscillator 51. This comparison is used to effect control of the phase shifter 53 to maintain the required phase lock between the radiated slave signals and the output of the oscillator 51. A manually adjustable phase shifter 58 is provided between the oscillator 51 and the discriminator 56 to enable manual adjustment to be effected of the phase relationship between the slave transmission and the received master signal for pattern setting. An indicator 59 is coupled to the phase shifter 58 for indicating any phase shift introduced by this phase shifter.

It will be seen that the slave station has two oscillators 35 and 51 which provide outputs locked in phase with the received master signals. The slave station radiates signals locked in phase with the outputs from the oscillators 35 and 51 and thus the slave signals although occurring after the master transmissions have ended in each cycle are locked in phase with the appropriate master transmissions. The timer 33 serves to open the various gates by providing gating pulses on the leads T1, T2, T3 and T4 at the appropriate periods. Very short duration guard intervals are provided between the closing of one gate and opening of the next to allow a reasonable tolerance in the transmissions cycle timing and to prevent any transient or overlap effects in the operation.

Although the slave transmitter has been shown with the phase discriminators operating at the received radio frequencies, if desired a heterodyne oscillator could be provided to change the received frequencies into intermediate frequency signals which are then fed into the phase discriminators 34, 50 and the oscillators 35 and 51 would then be arranged to operate at the appropriate intermediate frequencies. In this case the output from the oscillators 35, 51 would be mixed with the appropriate heterodyning signal to provide the required radio frequency signals for radiating from the aerial 40.

FIGURE 3 illustrates a mobile receiver and has an aerial 70 for receiving the radiated signals and feeding them to radio frequency amplifiers 71, 72 which are tuned to the frequencies of oscillators 10 and 11 that is to say the frequencies radiated by the master and slave stations for phase comparison purposes. From the radio frequency receiver 72 the synchronising signals are separated and fed to a timer 73 which controls the operation of the gates in the mobile receiver by providing pulses on leads T5, T6, T7, T8, T9 and T10 to open the various gates at the appropriate periods. The output from the radio frequency receiver 71 is fed to a first discriminator 74 where it is compared in phase with the output of a stable oscillator 75 operating at the same frequency. The output of the discriminator is thus representative of the difference in phase between the signals from the radio frequency amplifier 71 and the oscillators 75. The discriminator output is fed through a gate 76 which is opened only during the period of the master transmission and the signals passing through the gate are used to control the oscillator 75 so that this oscillator is locked in phase with the received master signals. The output from the radio frequency amplifier 71 is also fed to a second discriminator 77 which compares the phase of the received signals with the output from the oscillator 75, this output from the oscillator 75 being fed to the discriminator 77 through a goniometer type phase shifter 78. The output from the discriminator 77 is fed through a gate 79 which is opened during the period of the first slave transmissions so as to provide a control signal representative of the phase relationship between the received signals from that slave and the output from the oscillator 75. This control signal is used to drive the goniometer type phase shifter 78 so that the latter takes up a setting representative of the phase relationship between the received slave signals and the output from the oscillator 75 which is locked to the master signals. The goniometer 78 thus provides a rotational movement representative directly of the required phase relationship between the master signals and the slave signals at the frequency produced by the oscillator 10 of the master station.

For determining the phase relationship between the master signals and the transmissions from the second slave station the receiver includes a further phase discriminator 80 which compares the phase of the output from the radio frequency receiver 71 with the output from the oscillator 75, the oscillator output being applied to the phase discriminator through a goniometer type phase shifter 81. This phase shifter 81 is controlled in angular setting by the output of the discriminator 80, this output of the discriminator being applied to control the phase shifter 81 through a gate 82 which is opened only during the period of the second slave transmissions. The goniometer 81 thus provides a rotational movement representative of the phase relationship between the master transmissions, as preserved in the oscillator 75, and the received signals from the second slave station. The two phase shifters 78, 81 are coupled mechanically to indicators 83, 84 for indicating these phase relationships. These might be any convenient type of indicator for example the film strip type of indicator described in the specification of U.S. application No. 111,393 filed 19th May, 1961, now patent No. 3,158,863, which may be calibrated directly in terms of units of distance, for example feet or metres, by using strips appropriate to the radiated frequency. Another convenient form of indicator is a digital indicator displaying the phase angle indications as decimal digits.

In the arrangement of the present invention the master and slave stations radiate also on a second frequency and the signals of the second frequency are picked up by the aerial 70 and amplified by the radio frequency receiver 72 as previously described. The signals of the second frequency are used in the receiver of FIGURE 3 in a manner similar to those of the first frequency and for this purpose there is provided a phase discriminator 90 which compares the output of the radio frequency receiver 72 with the output of a stable oscillator 91 which is tuned to this second frequency. The phase discriminator 90 provides a control signal representative of the phase difference between the received signals and the oscillator output and this control signal is gated by a gate 92 which is opened during the period of the master transmissions only to provide a gated control for the oscillator 91 so that the latter is brought into phase lock with the received master signals. The output from the radio frequency receiver 72 is fed also to a further discriminator 93 where it is compared with the output from the oscillator 91 which oscillator output is fed to the discriminator 93 through a goniometer type phase shifter 94. The output from the discriminator 93 is applied through a gate 95 to control the phase shifter 94, the gate 95 being opened during the period of the first slave transmissions so that the phase shifter 94 provides a rotational movement representative of the phase angle between the master transmissions and the first slave signal as measured at this frequency. Similarly there is a further discriminator 96 which also compares the phase of the output from the radio frequency receiver 72 with the output from the oscillator 91, the oscillator output being applied to the phase discriminator 96 through a phase shifting goniometer 97 which is controlled by the output of the discriminator 96 during the period of the second slave transmissions, this being effected by means of a gate 98 in the control circuit from the phase discriminator 96 to the phase shifter 97. The phase shifter 97 thus provides a rotational movement representative of the phase angle between the master transmissions and the second slave transmissions at this frequency. For checking purposes it may be convenient to provide phase angle indicators 99, 100 driven by the phase shifters 94, 97, these being similar to the indicators 83, 84; in operational use however only one pair of indicators that is 83, 84 or 99, 100 would normally be used.

It will be seen that the indicators 83, 84, 99 and 100 give indications with respect to equiphase patterns. The spacing of the equiphase lines of each pattern depends on the effective comparison frequency which in this case will be radiated frequencies of the signals from the transmitting stations. The frequencies employed and the distances between the transmitting stations are normally such that there are many complete cycles of phase change in moving across the coverage area of the system. The phase angle within a cycle of phase change can be measured accurately and the indications provided by these indicators therefore enable a high degree of position accuracy to be obtained but are ambiguous unless the particular cycle of phase change or "lane" can be identified. Once the system is set up, the particular cycle can be identified by a counting or integrating type indicator counting the cycles of phase change as the receiver moves across the field or by the use of a long strip indicator as previously mentioned. For initial setting up or for checking the counting type indicator however it is desirable to have means for identifying the particular cycle of phase change and for this purpose it is required effectively to determine the position of the craft with respect to the much coarser pattern. To provide a coarse pattern, the outputs of the two phase shifters 78, 94 are applied to a differential type indicator 101 which gives an indication of the difference of the rotational movements of these two phase shifters. Similarly a further differential phase indicator 102 is provided coupled to the phase shifters 81 and 97 to give a phase angle indication representative of the difference of the rotational movements of the two phase shifters 81, 97. The indicators 101 and 102 provide indications in effect with respect to a coarse pattern of equiphase position lines, this pattern being a pattern at the difference frequency between the two radiated signals. As previously mentioned the difference between these two frequencies would typically be of the order of 5 to 10% of one of them and thus one lane of the coarse pattern would embrace 10 to 20 lanes of the fine pattern. The indicators 101 and 102 provide phase angle indication to define position lines within a lane of the coarse pattern and these indicators enable the particular lane of the fine pattern to be determined. The possible ambiguity in the reading of the fine pattern indicators can thus be resolved.

In the arrangement of FIGURE 3 the coarse pattern indicators 101, 102 are illustrated simply as differential indicators driven directly from the phase shifters. FIGURE 4 illustrates a modification of the arrangement of FIGURE 3 and shows the preferred form of coarse pattern indicators. In FIGURE 4 only part of the receiving equipment is shown as the remainder may be similar to that shown in FIGURE 3. Referring to FIGURE 4 there are illustrated the four goniometer type phase shifters 78, 81, 94 and 97. These are coupled to drive digital encoders, typically digit discs, four such encoders 110 to 113 being driven respectively by the phase shifters 78, 81, 94 and 97. Each digital encoder provides an output in digital form, typically in a Gray code, which is representative of the rotational position of the associated driving phase shifter. The outputs from the digital encoders 110 and 111 are fed into a digital difference unit 115 to obtain a difference signal in digital form representative of the difference of the angular positions of the phase shifters 78 and 94. This difference signal is compared in a digital comparator 116 with a signal in digital form from an encoder 117 mechanically driven by an electric motor 118. The comparator 116 provides an output representative of the difference of the digital signals from the units 115 and 117 and this output is used to control the motor 118 to drive the encoder in such a sense as to tend to bring the difference between the digital signals and units 115 and 117 to zero. This arrangement thus provides a servo drive for the encoder 117 to set it to give a digital output representative of the difference between the rotational positions of the phase shifter 78 and 94 and hence corresponding to the coarse pattern indication provided by the indicator 101 in FIGURE 3. This digital output may be used directly in a digital computer if the information is required for computational purposes in digital form and it will be noted that the digitizers 110 and 111 provide also in digital form the corresponding fine pattern indications for the two frequencies. The motor 118 however also provides a mechanical rotation corresponding to the output from the digitizer 117 and this may be used for example to drive an indicator 119. In FIGURE 4, this is illustrated as a drum-type indicator having a drum 120 on which is a helical scale 121 co-operating with a fixed index line 122, the index line being parallel to the axis of the drum. A suitable gearing may be provided in the drive to the drum from the motor. This drum-type indicator provides a long scale which may be calibrated in any convenient units, for example feet or metres, as required. The drum-type indicator is used since the coarse pattern may extend over several cycles of phase change at the effective comparison frequency, that is to say the difference frequency. There are thus some ambiguities in the coarse pattern information but these can normally be resolved from other navigational information. It will be appreciated that the navigator of a craft will have some approximate idea of the position of the craft. This enables the particular portion of the helical scale 121 on the drum 120 to be selected and the index mark 122 then enables the coarse position indication to be determined to a sufficiently high degree of accuracy to resolve any ambiguities in the indicators associated directly with the phase shifter 78 or 94. The use of a helical scale on a drum-type indicator enables the scale to be appropriately calibrated in any required units, which is not possible in a simple type of indicator having a rotating pointer traversing a circular scale since, in the latter case, the same scale calibrations have to be used during each cycle of traverse of the scale.

The indicator 119 provides a coarse pattern indication associated with the first slave station. A corresponding coarse pattern indication for the second slave pattern is provided by feeding the outputs of the digitizers 112 and 113 into a difference unit 125 the output of which is compared in a comparator 126 with the output of a digital encoder 127 driven by a motor 128. The motor 128 is controlled by the comparator 126 and drives an indicator assembly indicated diagrammatically at 129 which may be generally similar to the assembly 119 previously described.

I claim:

1. A radio navigation system wherein a plurality of signals of different frequencies are radiated from each of a number of spaced transmitting stations, signals of each frequency being radiated from one station at a time in a time-sharing sequence and a mobile receiver having an oscillator for each radiated frequency with control means controlling the phase of the oscillator output in response to the difference of phase between the oscillator ouput and one received signal of that frequency to provide at a mobile receiver, for each pair of stations used to obtain position line information, two pairs of simultaneously available comparison signals, the effective frequency of the comparison signals of one pair differing from the effective frequency of the comparison signals of the other pair by a frequency difference small compared with either of the two effective comparison frequencies and wherein, at the mobile receiver, there are provided phase determining means for producing rotational outputs in accordance with phase comparisons between the other signals from the two stations and oscillator outputs at each of said effective frequencies a first indicating means responsive to the output of one of said phase determining means, two digital encoders driven by said phase determining means to give two digital outputs in digital form representative of said phase comparisons, a difference unit for obtaining, from said two digital outputs, a difference signal in digital form and a second indicating means responsive to said difference signal.

2. A radio navigation system wherein signals of a first and a second frequency are radiated from each of a number of spaced transmitting stations, signals of each frequency being radiated from one station at a time in a time-sharing sequence in fixed phase relationship and the two frequencies having a frequency difference small compared with either of the two radiated frequencies and wherein, at a mobile receiver, there are provided, for each pair of stations used to obtain position line information, an oscillator for each radiated frequency with control means controlling the phase of the oscillator output in response to the difference of phase between the oscillator output and one received signal of that frequency. phase determining means for producing rotational outputs in accordance with phase comparisons between the oscillator outputs and the simultaneously available other radiated signals from said pair of stations at the first and second frequencies respectively, a first indicating means respsonsive to the rotational output of one of said phase determining means two digital encoders driven by said phase determining means to give two digital outputs in digital form representative of said phase comparisons, a difference unit for obtaining, from said two digital outputs, a difference signal and a second indicaing means responsive to said difference signal.

3. A radio navigation system as claimed in claim 2 wherein said second indicating means comprises an indicator mechanically driven by an electric motor, a further digital encoder driven by said motor and a comparator controlling the motor in accordance with the difference between the output of said further digital encoder and the output of said difference unit so as to tend to keep these two outputs equal.

4. A radio navigation system as claimed in claim 2 wherein said second indicating means comprises an elongated scale calibrated in units of distance and with cyclic repetition in accordance with complete cycles of phase change at the effective comparison frequency, and an index mark extending across the scale at a plurality of points thereon to indicate a number of alternative position line indications corresponding to a determined phase angle within each of the cycles of phase change, the index mark and the scale being movable relative to each other.

5. In a mobile receiver for radio navigation system wherein a plurality of signals of different frequencies are radiated in fixed phase relationship from each of a number of spaced transmitting stations to provide at the mobile receiver, two pairs of comparison signals, the effective frequency of the comparison signals of one pair differing from the effective frequency of the comparison signals of the other pair by a frequency difference small compared with either of the two effective comparison frequencies; the combination of phase determining means for producing rotational outputs in accordance with phase comparisons between signals from the two stations at each of said effective frequencies, an indicating means responsive to the difference of the rotational outputs of said phase determining means, said indicating means having an elongated scale calibrated in units of distance and with cyclic repetition in accordance with complete cycles of phase change at the effective comparison frequency, and having an index mark extending across the scale at a plurality of points thereon to indicate a number of alternative position line indications corresponding to a determined phase angle within each of the complete cycles of phase change, the index mark and the scale being movable relative to each other.

6. In a mobile receiver for a phase comparison radio navigation system wherein a plurality of signals of different frequencies are radiated in fixed phase relationship from each of a number of spaced transmitting stations to provide at the mobile receiver, two pairs of comparison signals, the effective frequency of the comparison signals of one pair differing from the effective frequency of the comparison signals of the other pair by a frequency difference small compared with either of the two effective comparison frequencies, the combination of phase determining means for producing rotational outputs in accordance with phase comparisons between signals from the two stations at each of the said effective comparison frequencies, and indicating means responsive to the difference of the rotational outputs of said phase determining means, said indicating means having a rotatable drum having an elongated scale extending helically around the drum calibrated in units of distance and with cyclic repetition in accordance with complete cycles of phase change at the effective comparison frequency, a window in front of the drum with an index line extending along said window parallel to the axis of the drum to cross the scale at a plurality of points to indicate a number of alternative position line indictions corresponding to a determined phase angle within each of the complete cycles of phase change.

References Cited by the Examiner
UNITED STATES PATENTS

| | | | |
|---|---|---|---|
| 2,394,287 | 2/46 | Bludworth | 343—12 |
| 2,582,588 | 1/52 | Tennessy et al. | 343—105 |
| 2,769,977 | 11/56 | Roberts et al. | 343—105 X |
| 2,844,816 | 7/58 | O'Brien et al. | 343—105 |
| 2,872,676 | 2/59 | Hunsicker | 343—105 |
| 2,947,985 | 8/60 | Cooley | 343—105 |
| 3,051,949 | 8/62 | Hunsicker | 343—105 |

OTHER REFERENCES

IRE Proceedings, May 1959 (pp. 829-835 relied on), Casselman et al.

CHESTER L. JUSTUS, *Primary Examiner.*